United States Patent
Miller

(10) Patent No.: US 12,475,679 B2
(45) Date of Patent: Nov. 18, 2025

(54) SYSTEM AND METHOD FOR OPTICAL DETECTION OF DRIVER TAMPERING OF A CAMERA IN A VEHICLE

(71) Applicant: Bendix Commercial Vehicle Systems LLC, Avon, OH (US)

(72) Inventor: Justin R. Miller, Elyria, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 379 days.

(21) Appl. No.: 18/130,759

(22) Filed: Apr. 4, 2023

(65) Prior Publication Data

US 2024/0338926 A1 Oct. 10, 2024

(51) Int. Cl.
*G06K 9/00* (2022.01)
*B60R 11/04* (2006.01)
*G06V 10/75* (2022.01)

(52) U.S. Cl.
CPC ............ *G06V 10/751* (2022.01); *B60R 11/04* (2013.01)

(58) Field of Classification Search
CPC .............................. B60R 11/04; G06V 10/751
See application file for complete search history.

(56) References Cited

U.S. PATENT DOCUMENTS

| | | | | |
|---|---|---|---|---|
| 9,961,240 | B2 * | 5/2018 | Wato | G06V 20/56 |
| 10,339,812 | B2 * | 7/2019 | Tamer | H04N 23/40 |
| 11,328,428 | B2 * | 5/2022 | Kahlbaum | G06T 3/4015 |
| 11,423,676 | B2 | 8/2022 | Xiang et al. | |
| 2014/0192191 | A1 * | 7/2014 | Sayegh | G08B 13/1472 340/568.1 |
| 2015/0279018 | A1 * | 10/2015 | Bajard | G06V 10/98 382/154 |
| 2019/0088108 | A1 * | 3/2019 | Mandadi | G08B 13/1961 |
| 2022/0327323 | A1 * | 10/2022 | Deshmukh | G06T 7/11 |

* cited by examiner

*Primary Examiner* — Avinash Yentrapati
(74) *Attorney, Agent, or Firm* — Crowell & Moring LLP

(57) ABSTRACT

A system and method are provided for optical detection of driver tampering of a camera in a vehicle. In one embodiment, an indication is provided that the camera is in a potentially-blocked state. In response, a determination is made regarding whether the driver tampered with the camera (e.g., using pixel comparison or by determining that the camera is in the potentially-blocked state on a plurality of occasions over a period of time). In response to determining that the driver tampered with the camera, the driver can be reported and/or a change can be made to the operation of the vehicle. Other embodiments are provided.

14 Claims, 3 Drawing Sheets

SYSTEM AND METHOD FOR OPTICAL DETECTION OF DRIVER TAMPERING OF A CAMERA IN A VEHICLE

BACKGROUND

Some vehicles have a camera that is used as part of the vehicle's safety system For example, a vehicle, such as a tractor capable of towing a trailer, can have a dashboard-mounted camera that faces outward in the direction of travel of the vehicle. Images captured by the camera can be analyzed to detect potential hazards (e.g., a stationary object, another vehicle, etc.) forward of the vehicle, and the safety system can automatically act in response to attempt to avoid colliding with the detected potential hazard. For example, the safety system can generate an audible alert and/or automatically apply the vehicle's brakes. Drivers have been known to intentionally blind/block the camera's field of view (e.g., by placing a business card, sticky note, or tape over the camera's lens) to disable the safety system or otherwise place it in a reduced functionality mode when they are frustrated with false alerts or think the safety system is too intrusive.

SUMMARY

In one embodiment, a non-transitory computer-readable storage medium is provided that stores computer-readable instructions that, when executed by one or more processors in a vehicle comprising a camera, cause the one or more processors to: in response to an indication that the camera is potentially in a driver-tampered state: perform a pixel comparison on at least two images captured by the camera over a period of time to determine a number of changed pixels; and perform at least one of the following in response to the number of changed pixels being below a threshold: report that a driver of the vehicle tampered with the camera; or cause a change in an operation of a vehicle system.

In another embodiment, a method is provided that is performed in a vehicle comprising a camera. The method comprises: determining whether the camera is in a potentially-blocked state at a first time; determining whether the camera is still in the potentially-blocked state at a second time; and in response to determining the camera is still in the potentially-blocked state at the second time, set a flag indicating that a driver of the vehicle tampered with the camera.

In yet another embodiment, a system is provided comprising: means for determining whether a driver tampered with a camera of a vehicle; and means for performing one or both of following in response to determining that the driver tampered with the camera: reporting that the driver tampered with the camera; or changing an operation of the vehicle.

Other embodiments are possible, and each of the embodiments can be used alone or together in combination.

DETAILED DESCRIPTION

Figure 1:
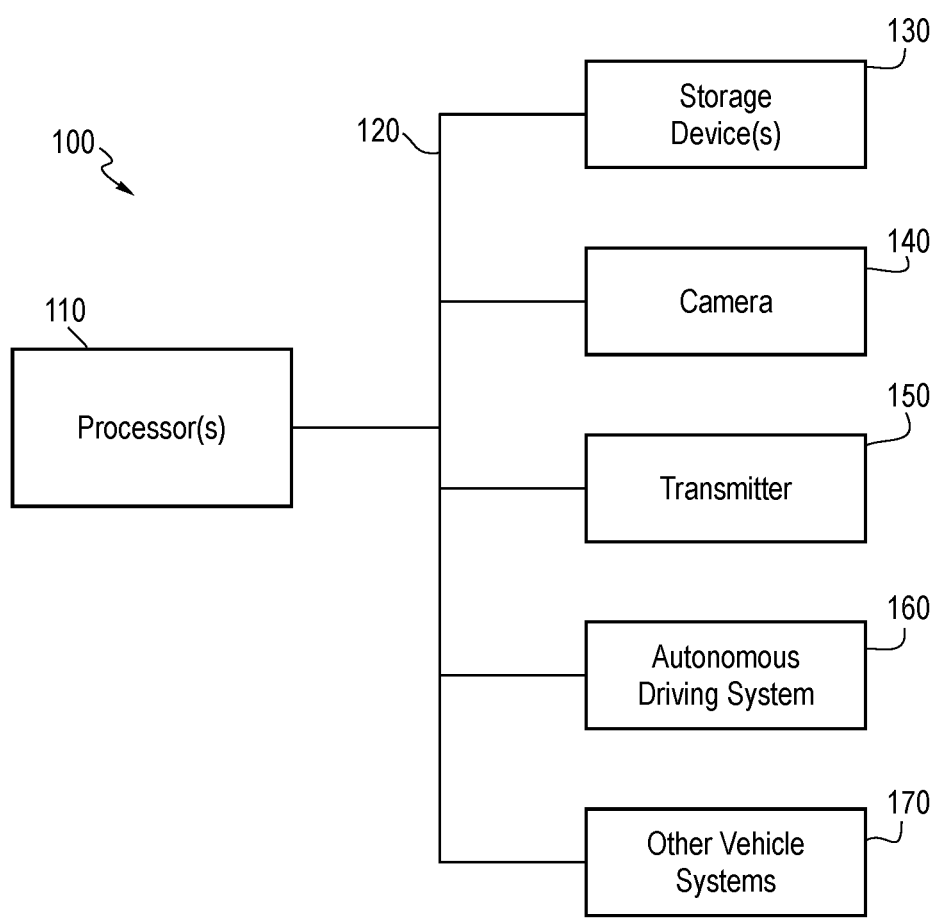
FIG. 1 is a diagram of a system of an embodiment for optical detection of driver tampering of a camera in a vehicle.

Turning now to the drawings, FIG. 1 is a diagram of a system 100 of an embodiment for use in a vehicle. In one embodiment, the vehicle takes the form of a tractor capable of towing a trailer. However, it should be understood that these embodiments can be used with any suitable type of vehicle, such as, but not limited to, a car, a truck, a van, a sports-utility vehicle (SUV), a motorcycle, an e-bike, a scooter, a boat, a plane, etc. Accordingly, these and other details discussed in these examples should not be read into the claims unless expressly recited therein.

As shown in FIG. 1, the system 100 in this embodiment comprises one or more processors 110 that are in wired or wireless connection (e.g., via a network, such as a Controller Area Network (CAN) 120) with storage device(s) 130. A storage device can be a non-transitory computer-readable storage medium and take any suitable form, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof. A storage device can be capable of storing computer-readable instructions (e.g., readable program code, modules, routines, sub-routines, etc.) that can be executed by the processor(s) 110 to perform the functions described herein and, optionally, other functions. The processor(s) 110 can also take the form of a purely-hardware implementation (e.g., an application-specific integrated circuit (ASIC)) that performs function(s) without executing a computer program stored in the storage device(s) 130.

In addition to the storage device(s) 130, the processor(s) 110 are also in communication with a camera 140, a transmitter 150, an autonomous driving system 160 (e.g., an advanced driver assistance system (ADAS)), and other vehicle systems 170. While only one of each box is shown in FIG. 1 to simplify the drawing, it should be understood that multiple one(s) of the components can be used (e.g., more than one storage device, more than one camera, etc.). Also, some of these components can be combined with other components (shown or not shown in FIG. 1). For example, the camera 140 can be part of a sub-system that contains its own memory and processor, and the transmitter 150 can be part of a transceiver system. More generally, while the processor(s) 110 are shown as a separate box from the other components, it should be understood that some or all of the processor(s) 110 can be in some or all of the other components (or in components not shown) and that the functionality provided by the processor(s) 110 can be shared or distributed.

In this embodiment, the camera 140 and autonomous driving system 160 are part of the vehicle's safety system. For example, the camera 140 can be a dashboard- or windshield-mounted, forward-facing camera that faces outward in the direction of travel of the vehicle. Images captured by the camera 140 can be analyzed by the processor(s) 110 to detect potential hazards (e.g., a stationary object, another vehicle, etc.) forward of the vehicle, and the autonomous driving system 160 can automatically act in response to avoid colliding with the detected potential hazard. For example, the autonomous driving system 160 can generate an audible alert and/or automatically apply the vehicle's brakes to avoid the potential collision. Alternatively, the camera 140 can be a driver-facing camera, a side-facing camera, a rear-facing camera, etc., and the processor(s) 110 can be configured to analyze images taken by those camera(s) and take action based on the analysis of those images.

As mentioned above, drivers have been known to intentionally blind/block the camera's field of view (e.g., by placing a business card, sticky note, or tape over the camera's lens) to disable the safety system or otherwise place it in a reduced functionality mode when they are frustrated with false alerts or think the safety system is too intrusive. The following embodiments can be used to detect when a driver has tampered with the camera 140 and take an action in response. For example, in response to an indication that the camera 140 is in a potentially-blocked state (and, optionally, if the vehicle's speed exceeds a certain threshold), the processor(s) 110 can determine whether the driver tampered with the camera 140 (e.g., using pixel comparison or by determining that the camera 140 is in the potentially-blocked state on a plurality of occasions over a period of time). In response to determining that the driver tampered with the camera 140, the processor(s) 110 can cause the driver to be reported and/or change the operation of the vehicle to penalize the driver for tampering with the camera 140 (e.g., by disabling cruise control). The operation of the vehicle can be restored when the camera 140 is no longer blocked.

Figure 2:
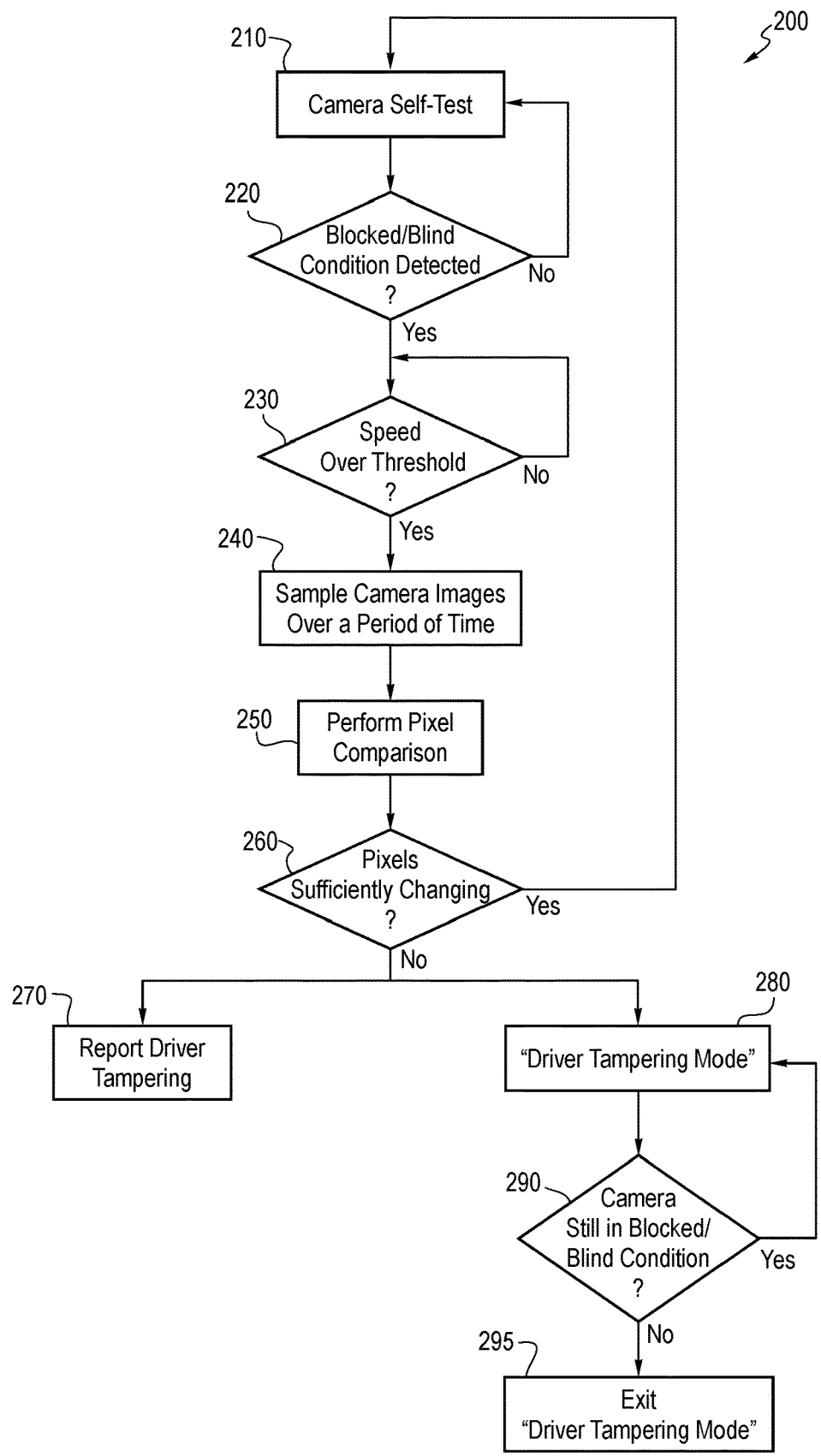
FIG. 2 is a flow chart of a method of an embodiment for optical detection of driver tampering of a camera in a vehicle.

FIG. 2 is a flow chart 200 of one example method of an embodiment. It should be understood that this is only an example, and the detailed discussed herein should not be read into the claims unless expressly recited therein. As shown in FIG. 2, first, the camera 140 performs a self-test (act 210), and a determination is made regarding whether the camera 140 is potentially in a driver-tampered state (e.g., whether the camera is blocked/blind) (act 220). This can be done, for example, by determining if a number of black (or white or some other color) pixels in one or more images captured by the camera 140 are above a threshold. This determination can be made by the processor(s) 110 doing this analysis or by the processor(s) 110 receiving an indication from the camera 140.

Next, the processor(s) 110 determine whether the speed of the vehicle is over a speed threshold (act 230). The processor(s) 110 can do this, for example, by taking a reading of a wheel speed sensor or by analyzing position data (e.g., Global Position Sensor (GPS) data). If the vehicle is moving below a certain threshold (e.g., 50 kph), this can indicate that the vehicle is driving in a city, where the likelihood of sampled images legitimately being the same is higher than when driving faster (e.g., indicating highway driving), where the environment captured is more likely to change. So, using speed as a gating factor can make the system more robust. In some embodiments, this is an optional act.

If the speed is over the threshold, the processor(s) 110 can samples images from the camera 140 over a period of time (e.g., every three minutes for half an hour) (act 240). Then, the processor(s) 110 perform pixel comparison on the images (act 250) to determine if the pixels sufficiently change over the sampled images (act 260), which would suggest that the camera 140 was not blocked by the driver. That is, there can be legitimate reasons while the camera 140 is blocked/blind, including, but not limited to, sun glare, headlights at night, low-visibility night-time driving, fog, snow, and rain. However, even under such conditions, the pixels in the image should change, even to a small degree, when the vehicle is moving and the environment changes.

Pixel comparison can be done in any suitable way. For example, in one embodiment, using images stored in a buffer, pixel comparison can be made via thresholding. The thresholding can be done, for example, using mean squared error (MSE) and/or a structurally similar index method (SSIM). Each captured image can be compared to the original sample and the prior sample, calculating MSE and SSIM and saving the values in an array (the values can be parameterizable). This process can be repeated, in this example, for ten samples over 30 minutes. Using SSIM, if the moving average is >0.97, for example, it is likely that the camera 140 has been intentionally blocked. Using MSE, if the moving average of the MSE is relatively low (e.g., <1,000), it is likely that the camera 140 has been intentionally blocked. Any combination of metrics or other image comparison functions that allow for a pass/fail threshold to be set can be used.

If the processor(s) 110 determine that the pixels in the image have not sufficiently changed (e.g., if the number of changed pixels is below a threshold), a driver tampering flag can be set/activated, and the processor(s) 110 can report driver tampering (act 270) and/or cause the vehicle to operate in a "driver tampering" mode, which changes an operation of the vehicle to penalize the driver for tampering with the camera 140 (act 280). To report driving tampering, the processor(s) 110 can cause the transmitter 150 to transmit information indicating driver tampering (e.g., the flag, a report, etc.) to an external entity, such as a supervisor, a back-office, fleet manager for driver coaching, etc. Alternatively, the processor(s) 110 can report the driver by storing the information in the storage device(s) 130 for later retrieval.

There are many ways that the processor(s) 110 can change an operation of the vehicle to penalize the driver for tampering with the camera 140. For example, the processor(s) 110 can modify the operation of the autonomous driving system 160 to temporarily disable the cruise control feature, which would remove a convenience feature for the driver. As another example, the processor(s) 110 can modify the operation of one of the other vehicle systems 170 to, for example, increase driver warnings, prevent the use of other convenience features, shutdown the complete ADAS system, honk the horn, turn the hazard lights on, apply zero torque to the transmission, de-throttle the engine, etc.

The processor(s) 110 can continue to monitor the images captured by the camera 140 to see if the camera 140 is still in the blocked/blind condition (act 290). If the camera 140 is no longer in the blocked/blind condition, the processor(s) 110 can exit the "driver tampering" mode and cause the operation of the vehicle to be restored (e.g., re-enable to cruise control feature) (act 295).

Many alternatives are possible. For example, instead of using pixel comparison to determine whether a driver tampered with the camera 140, the processor(s) 110 can determine whether the camera 140 is in a potentially-blocked state over a period of time. This alternative will now be described with reference to the flow chart 300 in FIG. 3.

Figure 3:
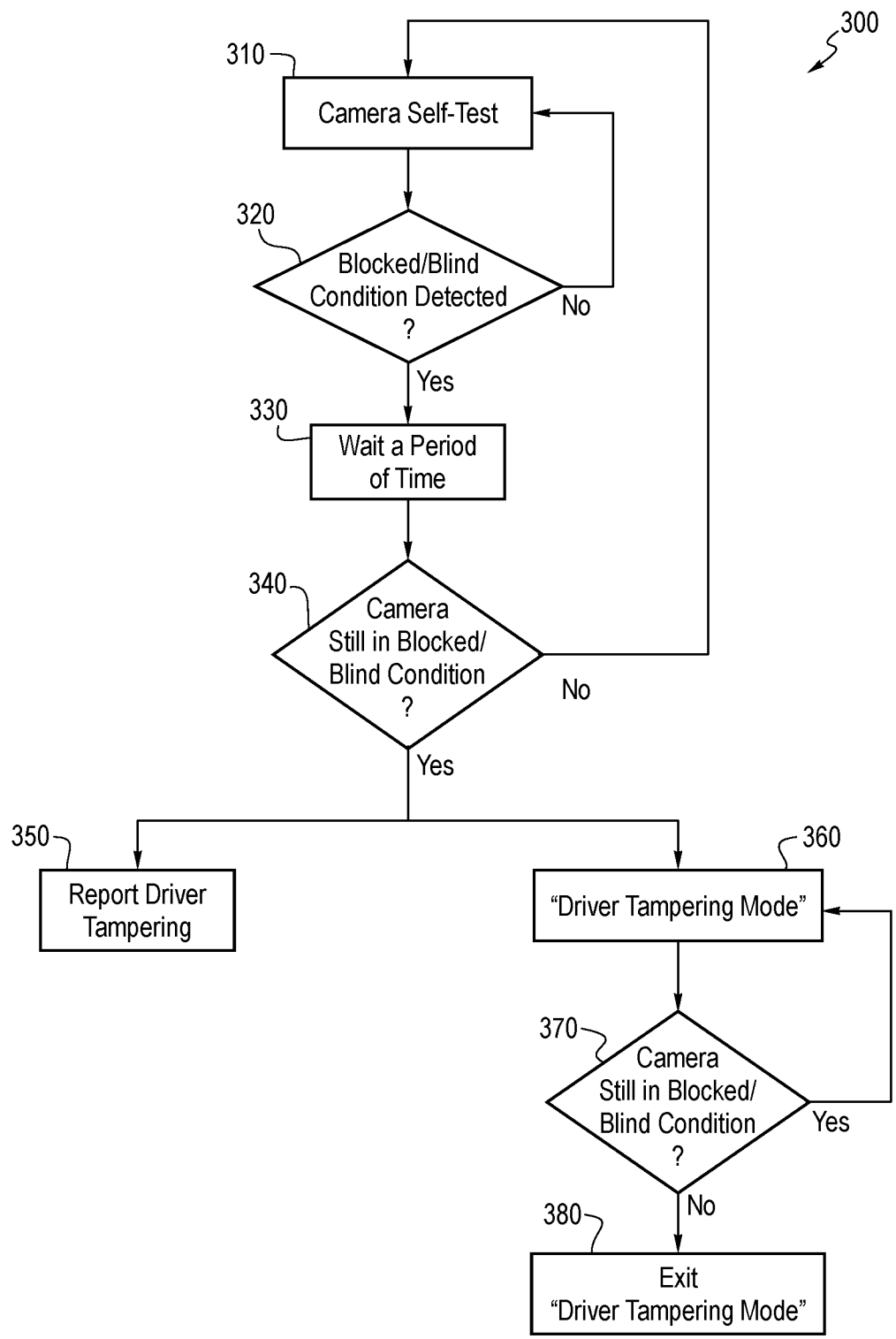
FIG. 3 is a flow chart of a method of an embodiment for optical detection of driver tampering of a camera in a vehicle.

As shown in FIG. 3, the camera 140 performs a self-test (act 310), and a determination is made regarding whether the camera 140 is potentially in a driver-tampered state that causes the camera to be blocked/blind (act 320), as in the method discussed above with respect to FIG. 2. If it is, the processor(s) 110 wait a period of time (act 330) and check to see if the camera 140 is still in a blocked/blind condition (act 340). For example, after the camera 140 is first detected to be in a blocked/blind condition, the processor(s) 110 can start a timer that counts the cumulative amount of time above a certain speed (e.g., 50 kph) that the camera 140 is reporting a blocked/blind condition. If the timer reaches a predetermined threshold (e.g., three hours of blocked/blind driving above 50 kph), the processor(s) 110 can conclude that the driver tampered with the camera 140. The expectation is that legitimate causes for the camera 140 to be blocked/blind (e.g., sun glare, headlights at night, low-visibility night time driving, fog, snow, rain, etc.) will not hold for an extended drive cycle, such as three hours. If the camera 140 is still in a blocked/blind condition, the processor(s) 110 can report driver tampering (act 350) and/or cause the vehicle to enter a "driver tampering" mode (act 360), as in the method discussed above with respect to FIG. 2. The processor(s) 110 can later check to see if the camera 140 is still in the blocked/blind condition (act 370). If the camera 140 is no longer in that condition, the processor(s) 110 exits "driver tampering" node (act 380).

In another alternative, the processor(s) 110 both perform pixel comparison and determinate whether the camera 140 is still in a blocked stated after a period of time. In one alternative, action is taken only after both methods conclude driver tampering. In another alternative, progressive action is taken (e.g., reporting is done if the camera 140 is still in a blocked stated after a period of time, and cruise control is disabled if the result of the pixel comparison indicates driver tampering).

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein. Additionally, "in response to" can be directly in response to or indirectly in response to. Also, the term "or" as used herein is to be interpreted as inclusive or meaning any one or any combination. Therefore, "A, B or C" means "any of the following: A; B; C; A and B; A and C; B and C; A, B and C".

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A non-transitory computer-readable storage medium storing computer-readable instructions that, when executed by one or more processors in a vehicle comprising a camera, cause the one or more processors to:
   in response to an indication that the camera is potentially in a driver-tampered state:
      perform a pixel comparison on at least two images captured by the camera over a period of time to determine a number of changed pixels; and
      perform at least one of the following in response to the number of changed pixels being below a threshold:
         report that a driver of the vehicle tampered with the camera; or
         cause a change in an operation of a vehicle system to penalize the driver for tampering with the camera;
   wherein the instructions, when executed, further cause the one or more processors to:
      determine whether a speed of the vehicle exceeds a speed threshold, wherein the pixel comparison is performed in response to the speed of the vehicle exceeding the speed threshold.

2. The non-transitory computer-readable storage medium of claim 1, wherein the instructions, when executed, further cause the one or more processors to both report that the driver of the vehicle tampered with the camera and cause one or more changes in the operation of the vehicle system.

3. The non-transitory computer-readable storage medium of claim 1, wherein the one or more changes comprises disabling a cruise control feature of the vehicle.

4. The non-transitory computer-readable storage medium of claim 1, wherein the instructions, when executed, further cause the one or more processors to:
   cause the operation of the vehicle system to be restored in response to the camera no longer potentially being in the driver-tampered state.

5. The non-transitory computer-readable storage medium of claim 1, wherein the indication that the camera is potentially in the driver-tampered state is generated in response to a self-test of the camera.

6. The non-transitory computer-readable storage medium of claim 1, wherein the pixel comparison is performed using mean squared error (MSE).

7. The non-transitory computer-readable storage medium of claim 1, wherein the pixel comparison is performed using a structurally similar index method (SSIM).

8. The non-transitory computer-readable storage medium of claim 1, wherein the camera comprises a forward-facing camera.

9. The non-transitory computer-readable storage medium of claim 1, wherein the camera comprises a driver-facing camera.

10. A method comprising:
    performing in a vehicle comprising a camera:
       determining whether the camera is in a potentially-blocked state at a first time;
       determining whether the camera is still in the potentially-blocked state at a second time;
       in response to determining the camera is still in the potentially-blocked state at the second time, set a flag indicating that a driver of the vehicle tampered with the camera and
       determining whether a speed of the vehicle exceeds a threshold, wherein determining whether the camera is still in the potentially-blocked state at the second time is performed in response to the speed of the vehicle exceeding the threshold.

11. The method of claim 10, further comprising:
    transmitting the flag to an external entity.

12. The method of claim 10, further comprising:
    in response to the flag being set, causing a change to an operation of the vehicle.

13. The method of claim 12, wherein the change to the operation of the vehicle comprises disabling the vehicle's cruise control.

14. The method of claim 12, further comprising:
  removing the flag in response to determining that the camera is not in the potentially-blocked state at a third time, wherein removing the flag restores the operation of the vehicle to its prior state.

* * * * *